(12) United States Patent
Matsubara et al.

(10) Patent No.: US 8,054,012 B2
(45) Date of Patent: Nov. 8, 2011

(54) MOTOR DRIVING APPARATUS

(75) Inventors: Shunsuke Matsubara, Yamanashi (JP); Yasusuke Iwashita, Yamanashi (JP); Yuuichi Yamada, Yamanashi (JP); Shigeki Hanyu, Yamanashi (JP); Masatomo Shirouzu, Yamanashi (JP); Koujirou Sakai, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 517 days.

(21) Appl. No.: 12/244,999

(22) Filed: Oct. 3, 2008

(65) Prior Publication Data

US 2009/0091281 A1 Apr. 9, 2009

(30) Foreign Application Priority Data

Oct. 5, 2007 (JP) .................................. 2007-262464

(51) Int. Cl.
*H02P 1/00* (2006.01)
(52) U.S. Cl. ........................................ 318/139; 318/801
(58) Field of Classification Search .................. 318/139, 318/798, 799, 800, 801
See application file for complete search history.

(56) References Cited

U.S. PATENT DOCUMENTS

| | | | | | |
|---|---|---|---|---|---|
| 4,545,464 | A | * | 10/1985 | Nomura | 187/296 |
| 6,133,651 | A | * | 10/2000 | Kono et al. | 307/64 |
| 6,215,287 | B1 | * | 4/2001 | Matsushiro et al. | 323/222 |
| 6,522,099 | B2 | * | 2/2003 | Tominaga et al. | 318/801 |
| 2002/0189906 | A1 | * | 12/2002 | Tominaga et al. | 187/290 |
| 2003/0030404 | A1 | * | 2/2003 | Iwaji et al. | 318/700 |
| 2006/0033457 | A1 | * | 2/2006 | Won et al. | 318/254 |
| 2007/0137945 | A1 | * | 6/2007 | Takasaki et al. | 187/290 |

FOREIGN PATENT DOCUMENTS

| | | | |
|---|---|---|---|
| JP | 8308025 | A | 11/1996 |
| JP | 10155298 | A | 6/1998 |
| JP | 11299275 | A | 10/1999 |
| JP | 2000236679 | A | 8/2000 |
| JP | 2003333891 | A | 11/2003 |
| JP | 2004364457 | A | 12/2004 |
| JP | 2005052384 | A | 3/2005 |
| JP | 2005324884 | A | 11/2005 |

OTHER PUBLICATIONS

Office Action of Chinese Patent Application No. 2008101661097 mailed Jan. 22, 2010.
Notice of Reasons for Rejection for JP 2008-231275 dated Dec. 26, 2008.
Notice of Reasons for Rejection for JP2008-231275 mailed May 19, 2009.

* cited by examiner

*Primary Examiner* — Rina Duda
(74) *Attorney, Agent, or Firm* — Lowe Hauptman Ham & Berner LLP

(57) ABSTRACT

A motor driving apparatus having a converter, which receives AC voltage and converts it to DC power, and an inverter, which receives the DC power and converts it to AC power, includes a charge/discharge control circuit and a capacitor connected in parallel to a link section between the converter and the inverter, and energy stored in the capacitor C8 is charged and discharged at arbitrary timing by the charge/discharge control circuit. The invention thus provides a motor driving apparatus that supplies energy to a motor so that the peak of the input current from a power supply to the motor can also be suppressed when particularly large energy is needed during the second half period of motor acceleration.

7 Claims, 12 Drawing Sheets

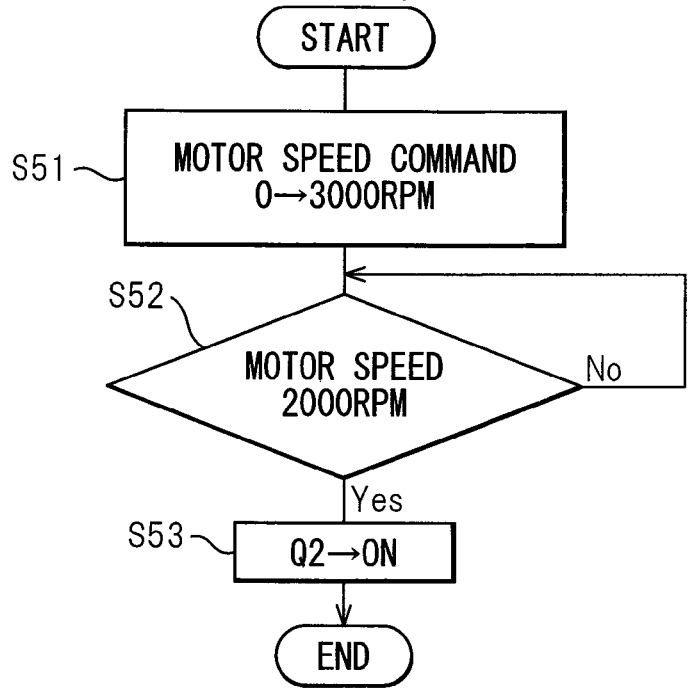
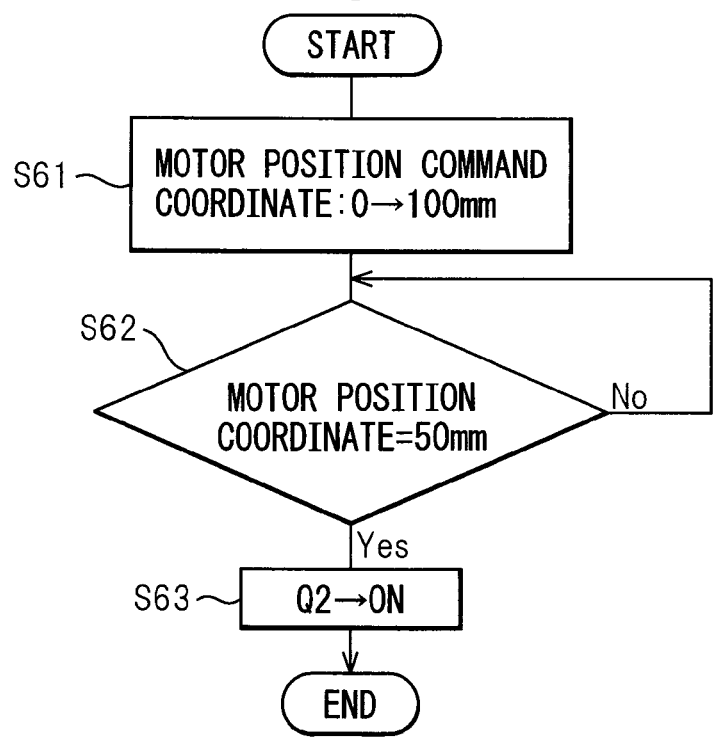

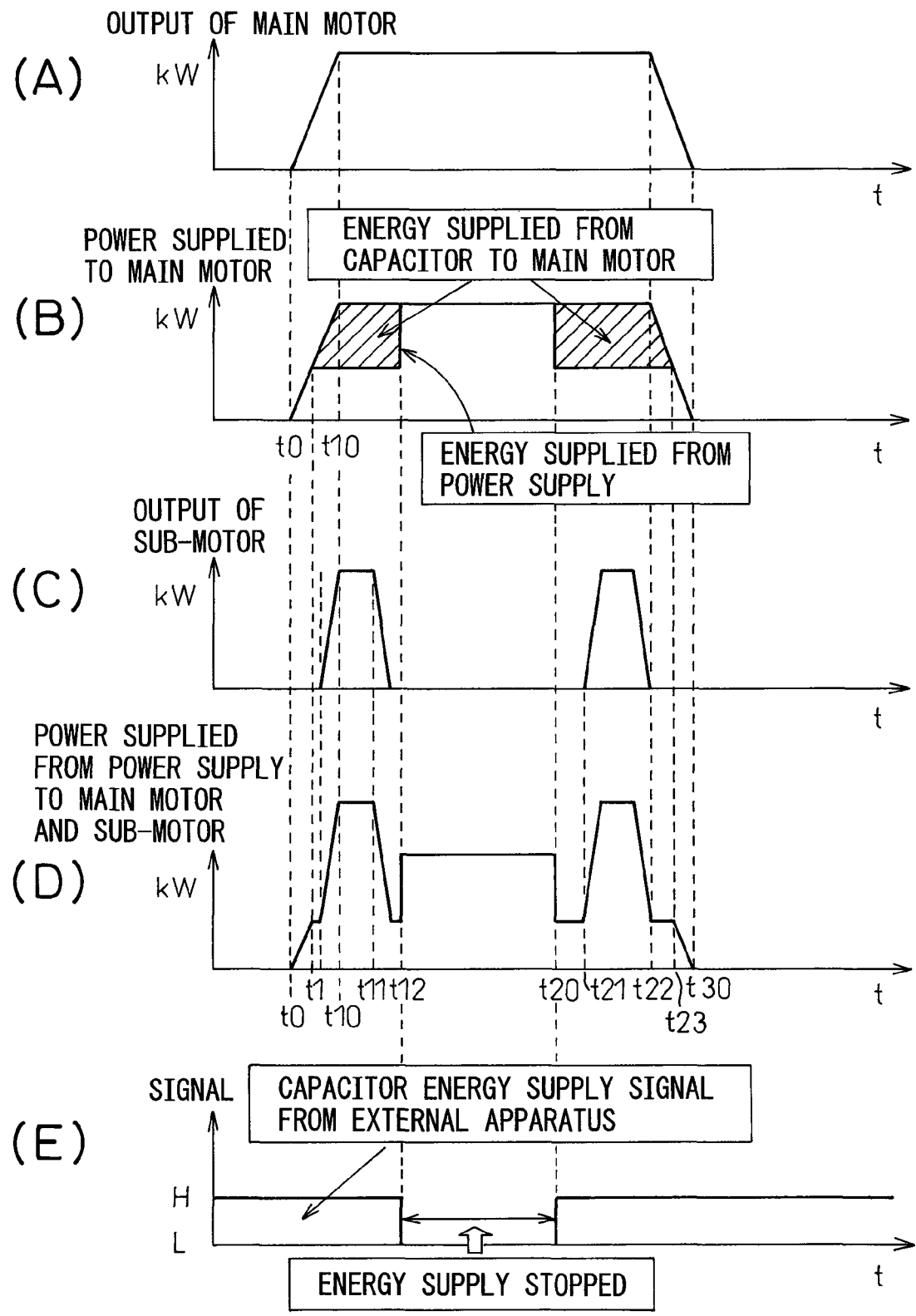

MOTOR DRIVING APPARATUS

RELATED APPLICATIONS

The present application is based on, and claims priority from, Japanese Application Number 2007-262464, filed Oct. 5, 2007, the disclosure of which is hereby incorporated by reference herein in its entirety.

BACKGROUND OF THE INVENTION

1. Field of the Invention

The present invention relates to a motor driving apparatus, and more particularly to a motor driving apparatus that stores regenerative energy recovered during motor deceleration into a capacitor and that uses the recovered energy as powering energy during motor acceleration.

2. Description of the Related Art

[Background Art]

FIG. 13 is a circuit diagram of a motor driving apparatus according to the prior art. The motor driving apparatus 101 shown in FIG. 13 includes a converter 2, an inverter 3, a motor 4, an inverter control circuit 5, and a smoothing capacitor 6. In FIG. 13, reference numeral 109 indicates a converter output current, 110 a converter input current, 111 a DC link current, 112 a capacitor output current, and 113 a DC link voltage (capacitor voltage). For reference numerals 110 to 113, a description will be given later with reference to FIGS. 14(A) to 14(F) by using the results of simulation of waveforms in operation of the motor driving apparatus 101.

AC power is supplied to the converter 2, which rectifies the AC to DC and charges the smoothing capacitor 6. The inverter 3, which converts the DC to AC, receives the DC voltage energy stored in the capacitor 6, and drives the motor 4, a three-phase induction motor, by switching the transistors forming the inverter 3 on and off under the control of the inverter control circuit 5.

FIGS. 14(A) to 14(C) are diagrams showing the relationship between motor speed and power in the motor driving apparatus according to the prior art, and FIGS. 14(D) to 14(F) are time charts showing the results of simulation of the various parts during operation. In FIGS. 14(A) to 14(F), the abscissa represents the time, the ordinate in FIG. 14(A) represents the motor speed RPM, the ordinate in FIG. 14(B) represents the power kW supplied to the motor, the ordinate in FIG. 14(C) represents the power kW supplied from the power supply to the motor, the ordinate in FIG. 14(D) represents the DC link current, the ordinate in FIG. 14(E) represents the converter input current and the capacitor output current, and the ordinate in FIG. 14(F) represents the DC link voltage (capacitor voltage).

As can be seen from FIGS. 14(A) to 14(C), power is supplied from the capacitor C6 to the motor 4 during a prescribed period from time t11 to time t12 in the early part of acceleration, and power is supplied to the motor 4 from the power supply as well as from the capacitor C6 during a prescribed period from time t12 to time t13 in the late part of acceleration. That is, the energy stored in the capacitor C6 is supplied to the motor 4 during the first half period of acceleration, starting from acceleration start time t11 to time t12, and not only the energy stored in the capacitor C6 but also the power from the power supply is supplied to the motor 4 during the second half period of acceleration from time t12 to time 13.

If the output required of the motor 4 is large during the second half period of acceleration from time t12 to time 13, the energy stored in the capacitor C6 may be used up, in which case only the current from the power supply is supplied to the motor 4. As a result, the peak of the input current increases. As described above, the regenerative energy stored in the capacitor C6 is supplied to the motor 4, starting from the acceleration start time t11.

During the constant speed period from time t13 to time t14 after the end of the acceleration, power is supplied from the power supply to the motor 4, and during the deceleration period from time t14 to time t15, regenerative energy is stored in the capacitor C6.

Patent document 1 discloses a motor driving apparatus in which a capacitor for storing regenerative energy is connected in parallel between a converter, which receives AC voltage and converts it to DC power, and an inverter (power driver), which receives the DC power and converts it to AC power, wherein the regenerative energy recovered during motor deceleration is stored in the capacitor, and the thus stored energy is used as powering energy during motor acceleration. According to this motor driving apparatus, by using the regenerative energy as powering energy, the power to be supplied from the power supply decreases, and the average power thus decreases. In this motor driving apparatus, the regenerative energy stored in the capacitor is supplied to drive the motor, starting from the time that the motor begins to accelerate.

FIGS. 15(A) to 15(D) are diagrams showing motor output in the motor driving apparatus according to the prior art. In FIGS. 15(A) to 15(D), FIG. 15(A) shows the output of the main motor (indicated by reference numeral 4 in FIG. 13), FIG. 15(B) shows the power supplied to the main motor 4, FIG. 15(C) shows the output of a sub-motor, and FIG. 15(D) shows the power supplied from the power supply to the main motor 4. In FIGS. 15(A) to 15(D), the abscissa represents the time t, and the ordinate represents the output kW.

As shown in FIG. 15(A), when power is supplied to the main motor 4, the output of the main motor 4 begins to increase at output start time t0 and continues to increase gradually until time t10 at which the motor reaches a constant speed; then, the output begins to decrease at output end time t22 and continues to decrease gradually until time t30 at which the motor stops.

As shown in FIG. 15(B), since there is a limit to the power supplied from the capacitor (indicated by reference numeral 6 in FIG. 13) to the main motor 4, the capacitor 6 may cease to supply power to the main motor 4 in the middle of the motor operation. FIG. 15(C) shows the output of the sub-motor not shown in FIG. 13, and FIG. 15(D) shows the power supplied from the power supply to the main motor 4.

Since the power being supplied from the capacitor 6 to the main motor 4 may cease, as described above, power is supplied from the power supply to the main motor 4 during the period from time t20 to time t30 after the capacitor 6 has ceased to supply power to the main motor 4. If it is required that power be supplied to the sub-motor (not shown in FIG. 13) after time t20, i.e., after the capacitor 6 has ceased to supply power, power cannot be supplied from the capacitor 6 to the main motor 4 after that time t20. As a result, after time t20, power is supplied to the main motor 4 only from the power supply.

As shown in FIG. 15(D), during the period from time t2 to time t20, the power to the main motor 4 is supplied from the power supply as well as from the capacitor 6, and during the period from time t0 to time t2 and the period after time t20, the power is supplied only from the power supply.

As can be seen from the above, in the motor driving apparatus according to the prior art, the electric energy stored in the capacitor 6 cannot be used where the supply of power to the main motor 4 is needed in order to meet the requirement of the machine, but is used where it is not needed, and hence the problem that the electric energy stored in the capacitor 6 is not used efficiently in the motor driving apparatus.

[Patent document 1] Japanese Unexamined Patent Publication No. 2000-141440 (refer to the claim in [claim 1], the description from paragraph [0014] to paragraph [0025], and the drawings [FIG. 2] and [FIG. 3])

DISCLOSURE OF THE INVENTION

Problem to be Solved by the Invention

As described above, the motor driving apparatus disclosed in patent document 1 has the problem that, when supplying the regenerative energy stored in the capacitor during motor deceleration to the motor as powering energy during motor acceleration, if the energy is supplied starting from the time that the motor begins to accelerate, the energy stored in the capacitor is used up during the second half period of acceleration and the power has to be supplied from the power supply to the motor, since the powering energy supplied to the motor during motor acceleration is larger than the regenerative energy stored in the capacitor.

Further, in the second half period of acceleration, particularly large power is required to drive the motor, and if this required power is supplied from the power supply, the peak of the power being supplied from the power supply to the motor increases (being unable to suppress the peak power); as a result, the above motor driving apparatus is only effective in suppressing the average power supplied from the power supply, but is not effective in suppressing the power supplied to the motor during the peak period.

The present invention has been devised to solve the above problem, and an object of the invention is to provide a motor driving apparatus that supplies energy to the motor so that the peak of the input current from the power supply to the motor driving apparatus can also be suppressed when the regenerative energy stored in the capacitor during motor deceleration is used as powering energy during motor acceleration, that is, when particularly large energy is needed during the second half period of acceleration.

Another object of the invention is to provide a motor driving apparatus that performs control to efficiently use the electric energy stored in the capacitor, that is, to use the electric energy where the supply of power to the main motor is needed, but not to use it where it is not needed.

Means for Solving the Problem

To achieve the above objects, the invention provides a motor driving apparatus having a converter, which receives AC voltage and converts the AC voltage to DC power, and an inverter, which receives the DC power and converts the DC power to AC power, wherein the motor driving apparatus includes a charge/discharge control circuit and a capacitor connected in parallel to a link section between the converter and the inverter, and energy stored in the capacitor is charged and discharged at arbitrary timing by the charge/discharge control circuit.

In the motor driving apparatus, the arbitrary timing includes timing specified by an external input signal.

In the motor driving apparatus, the external input signal is a signal that is output from a limit switch for detecting a position of a moving object in a machine driven by a motor, or a signal that is output when a motor position specified by a program or the detected position of the moving object exceeds a predetermined position.

In the motor driving apparatus, when an AC current input from a power supply to the converter or a converter output current obtained by rectifying the AC current to DC current becomes equal to or exceeds a predetermined current value, a discharge circuit provided in the charge/discharge control circuit is turned on so that the energy stored in the capacitor is supplied to the inverter.

In the motor driving apparatus, when DC voltage in the link section becomes equal to or drops below a predetermined voltage value, a discharge circuit provided in the charge/discharge control circuit is turned on so that the energy stored in the capacitor is supplied to the inverter.

Effect of the Invention

According to the above configuration, in a motor driving apparatus that stores regenerative energy recovered during motor deceleration into a capacitor and that uses the recovered energy as powering energy during motor acceleration, the peak of the input current can be suppressed while also reducing the average power supplied from the power supply.

According to the above configuration, by suppressing the peak of the current input from the power supply to the motor driving apparatus, the voltage drop due to the impedance of the power supply can be suppressed.

BRIEF DESCRIPTION OF THE DRAWINGS

FIG. 5 is a flowchart of the present invention.

FIG. 6 is a flowchart of the present invention.

FIGS. 12(A) and 12(B) are diagrams each showing the output of a main motor in the motor driving apparatus according to the present invention.

FIG. 12(C) is a diagram showing the output of a sub-motor.

FIG. 12(D) is a diagram showing the energy supplied from the power supply to the main motor and the sub-motor.

FIG. 12(E) is a diagram showing an external signal for controlling discharge.

BEST MODE FOR CARRYING OUT THE INVENTION

Figure 1:
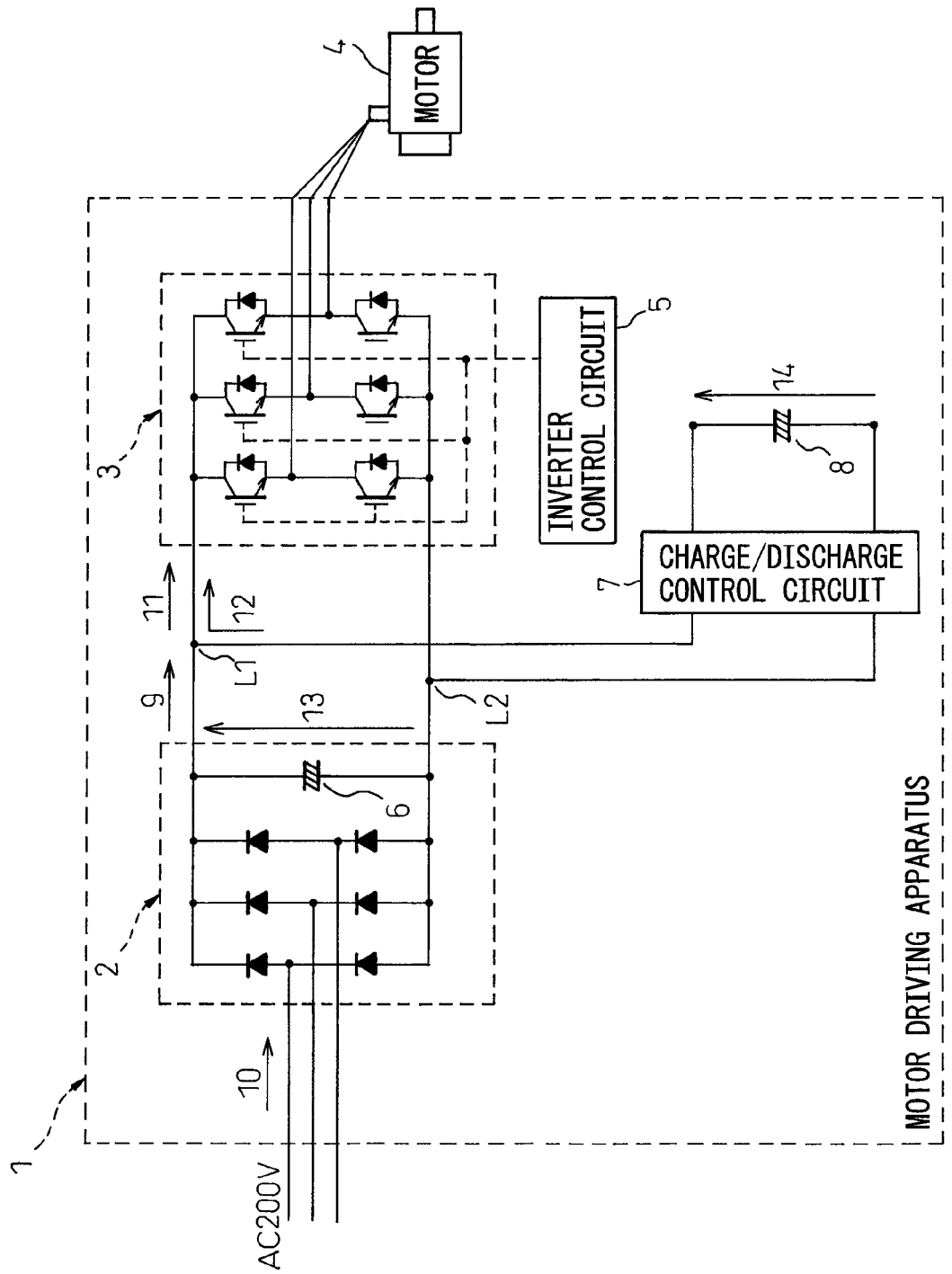
FIG. 1 is a circuit diagram of a motor driving apparatus according to one embodiment of the present invention.

FIG. 1 is a circuit diagram of a motor driving apparatus according to one embodiment of the present invention. The motor driving apparatus 1 shown in FIG. 1 includes a converter 2, an inverter 3, a motor 4, an inverter control circuit 5, a smoothing capacitor 6, a charge/discharge control circuit 7, and a capacitor 8. In FIG. 1, reference numeral 9 indicates a converter output current, 10 a converter input current, 11 a DC link current, 12 a capacitor output current, 13 a DC link voltage, and 14 a capacitor voltage. For reference numerals 10 to 14, a description will be given later with reference to FIGS. 7(A) to 7(G) by using the results of simulation of waveforms in operation of the motor driving apparatus 1.

AC power is supplied to the converter 2, which rectifies the AC to DC and charges the capacitor 8 via the smoothing capacitor 6 and the charge/discharge control circuit 7. The inverter 3, which converts the DC to AC, receives the energy stored in the capacitor 8 and drives the motor 4 by performing on/off switching under the control of the inverter control circuit 5.

Figure 2:
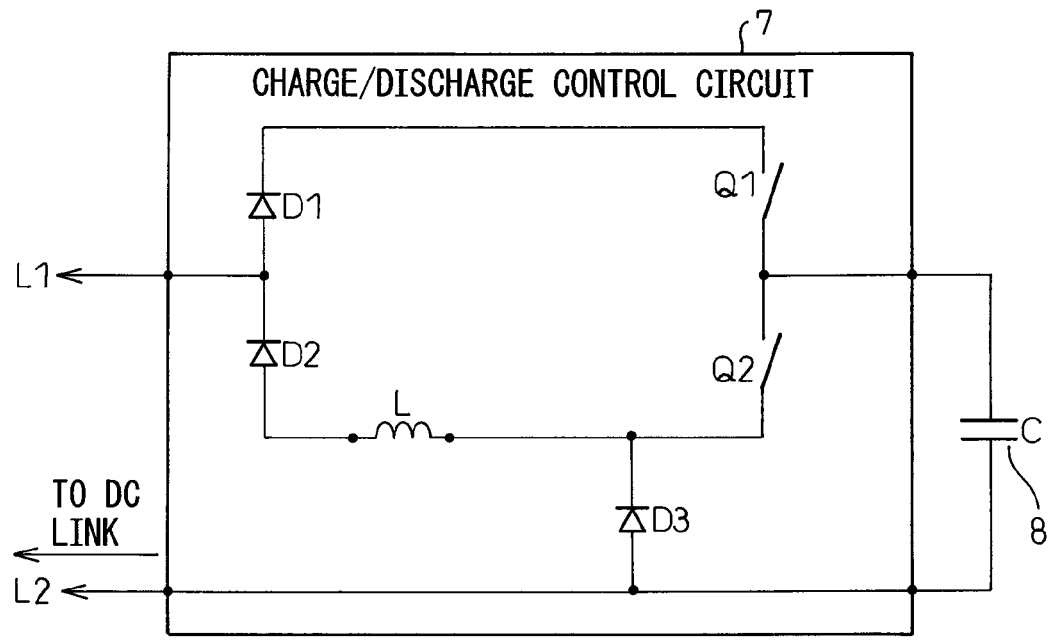
FIG. 2 is a detailed diagram of a first embodiment of a charge/discharge control circuit shown in FIG. 1.

FIG. 2 is a detailed diagram of a first embodiment of the charge/discharge control circuit 7 shown in FIG. 1.

The regenerative energy is stored via the following route:
Diode D1→Switch Q1→Capacitor C8

The energy is supplied (the regenerative energy is discharged) via the following route:
Capacitor C8→Switch Q2→Reactor L→Diode D2→DC link In FIG. 2, Q1 and Q2 may be IGBTs or the like.

(Description of Regenerative Energy Storing)

When the motor 4 begins to decelerate, the regenerative energy is recovered and stored in the capacitor C8 via the diode D1 and switch Q1 in the energy charge/discharge control circuit 7. Power conversion, etc. are not performed on the regenerative energy.

(Description of Energy Supply/Regenerative Energy Discharging)

When the motor 4 begins to accelerate, the switch Q2 in the energy charge/discharge control circuit 7 is turned on (or switched on and off) with the timing arbitrarily chosen to supply the energy stored in the capacitor C8. The reactor L is provided to suppress the rush current that occurs due to the presence of the potential difference between the DC link and the capacitor C8 immediately after the supply of energy is started. A diode D3 allows the energy stored in the reactor L to circulate when the switch Q2 is OFF.

By switching the switch Q2 on and off when supplying the energy stored in the capacitor C8, the amount of energy to be supplied from the capacitor C8 can be controlled, for example, by a constant-current or constant-voltage control method. An initial charge circuit and a discharge circuit (a circuit that reduces the voltage of the capacitor to 0 when the energy stored in the capacitor is no longer needed) will not be described here because these circuits have no relevance to the present invention.

Figure 3:
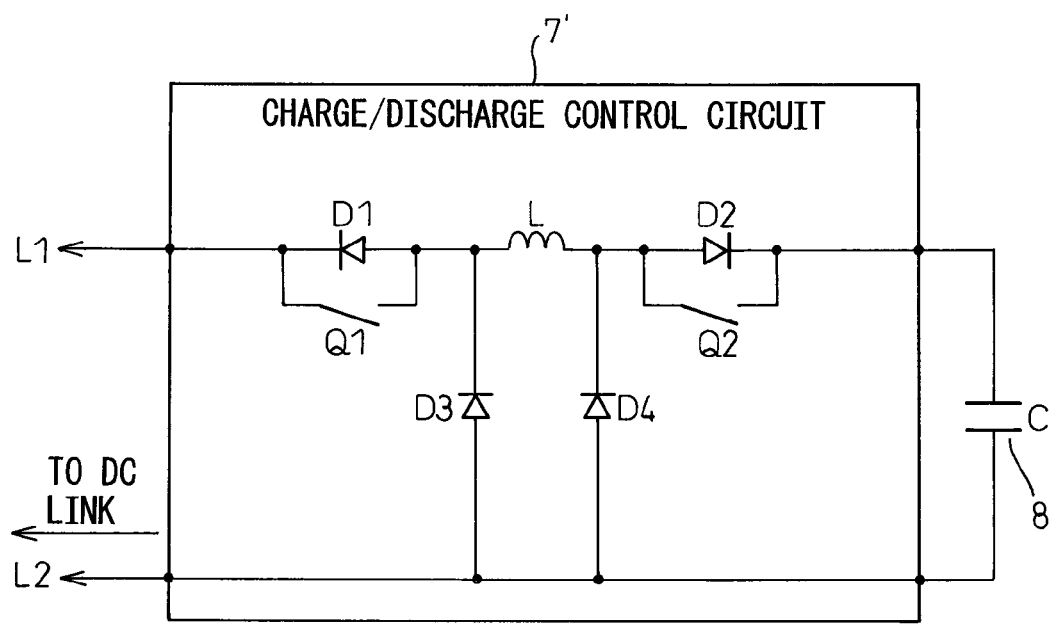
FIG. 3 is a detailed diagram of a second embodiment of the charge/discharge control circuit shown in FIG. 1.

FIG. 3 is a detailed diagram of a second embodiment of the charge/discharge control circuit 7 shown in FIG. 1.

The regenerative energy is stored via the following route:
Switch Q1→Reactor L→Diode D2→Capacitor C The energy is supplied (the regenerative energy is discharged) via the following route:
Capacitor C8→Switch Q2→Reactor L→Diode D1→DC link In FIG. 3, Q1 and Q2 may be IGBTs.

(Description of Regenerative Energy Storing)

When the motor 4 begins to decelerate, the regenerative energy is recovered and stored in the capacitor C8 via the switch Q1, reactor L, and diode D2 in the energy charge/discharge control circuit 7'. Power conversion, etc. are not performed on the regenerative energy.

(Description of Energy Supply/Regenerative Energy Discharging)

When the motor 4 begins to accelerate, the switch Q2 in the energy charge/discharge control circuit 7' is turned on (or switched on and off) with the timing arbitrarily chosen to supply the energy stored in the capacitor C8. The reactor L is provided to suppress the rush current that occurs due to the presence of the potential difference between the DC link and the capacitor C8 immediately after the supply of energy is started. A diode D4 allows the energy stored in the reactor L to circulate when the switch Q2 is OFF. A diode D3 allows the energy stored in the reactor L to circulate when the switch Q1 is OFF.

By switching the switch Q2 on and off when supplying the energy stored in the capacitor C8, the amount of energy to be supplied from the capacitor C8 can be controlled, for example, by a constant-current or constant-voltage control method.

Figure 4:
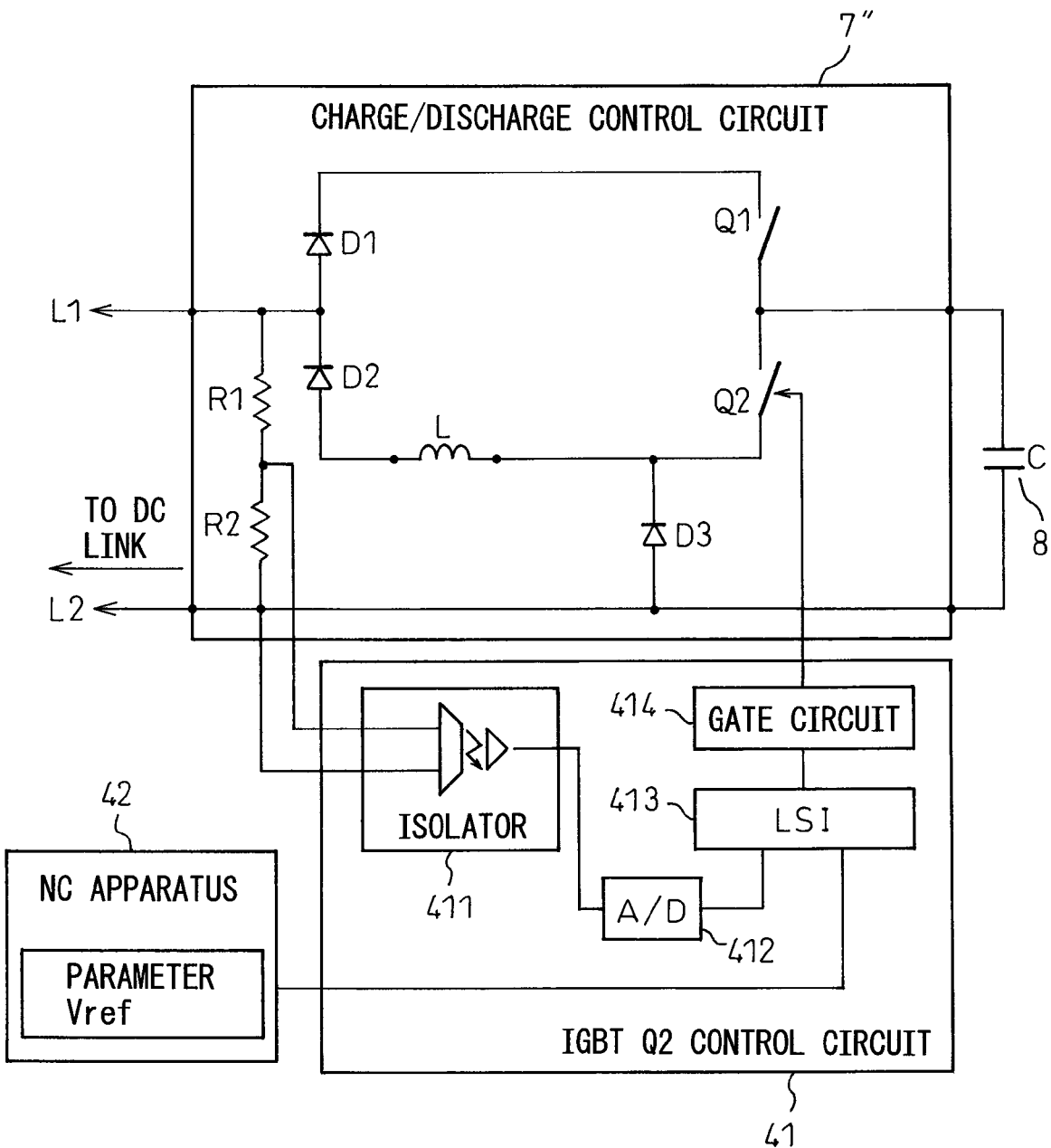
FIG. 4 is a detailed diagram of a third embodiment of the charge/discharge control circuit shown in FIG. 1.

FIG. 4 is a detailed diagram of a third embodiment of the charge/discharge control circuit 7" shown in FIG. 1.

The input current or output current of the converter 2 is monitored by a current sensor or the like not shown, and when the current becomes equal to or exceeds a predetermined current value, the switch Q2 in the charge/discharge control circuit 7 of the first embodiment shown in FIG. 2 or the charge/discharge control circuit 7' of the second embodiment shown in FIG. 3 is turned on. By monitoring the current in this way, it is determined whether the need has arisen to supply particularly large energy in the second half period of acceleration of the motor 4.

Next, referring to FIG. 4, an example will be described below in which a determination as to whether the need has arisen to supply particularly large energy in the second half period of acceleration of the motor 4 is made by monitoring a voltage. The voltage developed between the links L1 and L2 connecting the converter 2 and inverter 3 shown in FIG. 1 is divided between resistors R1 and R2, and the obtained DC voltage is monitored by an IGBT Q2 control circuit 41 that controls the switch Q2 formed, for example, from an insulated gate bipolar transistor (IGBT) semiconductor device; then, when the DC voltage becomes equal to or drops below a predetermined voltage value, the switch Q2 in the charge/discharge control circuit 7 of the first embodiment shown in FIG. 2 or the charge/discharge control circuit 71 of the second embodiment shown in FIG. 3 is turned on.

Parameter Vref defining the predetermined current value or voltage value can be changed using a parameter setting function incorporated in an NC apparatus 42 that is placed outside the motor driving apparatus 1 to control the motor driving apparatus 1. The NC apparatus 42 includes a computer (not shown), detects the position and the number of revolutions of the motor 4, and issues a speed command and a position command to the motor driving apparatus 1 to control the motor 4.

The IGBT Q2 control circuit 41 receives the DC voltage via an isolator 411 that provides electrical isolation from the charge/discharge control circuit 7", and an A/D converter 412 converts an analog signal output from the isolator 411 into a digital value which is input to an LSI 413. The LSI 413 checks its own reference value Vref or the parameter Vref of the predetermined current value or voltage value supplied from the NC apparatus 42, and activates a gate circuit 414 to turn on Q2 when the DC voltage becomes equal to or drops below the predetermined voltage value.

In the first embodiment of the energy charge/discharge control circuit, the energy supply start timing is chosen arbitrarily, while in the second and third embodiments, on the other hand, the energy supply start timing is determined by monitoring the input current or DC voltage. Next, the energy supply start timing and other timings will be described.

FIG. 5 is a flowchart in which the timing for turning on the switch Q2 in the charge/discharge control circuit is determined in accordance with the motor speed command. The process from steps S51 to S53 shown in this flowchart is built into a motor driving program which is stored in memory (not shown) internal to the NC apparatus 42 and is executed by the computer (not shown) constituting the NC apparatus 42.

If the motor speed at which some degree of energy supply becomes necessary during the acceleration of the motor 4 is known in advance, not only the motor speed command (in step S51, acceleration from 0 to 3000 RPM) but also the energy supply timing (in step S52, Q2 ON at 2000 RPM) is specified to the motor driving program, and the switch Q2 in the charge/discharge control circuit 7 of the first embodiment shown in FIG. 2 or the charge/discharge control circuit 7' of the second embodiment shown in FIG. 3 is turned on (step S53).

FIG. 6 is a flowchart in which the timing for turning on the switch Q2 in the charge/discharge control circuit is determined in accordance with the motor position command. The process from steps S61 to S63 shown in this flowchart is built into a motor driving program which is stored in memory (not shown) internal to the NC apparatus 42 and is executed by the computer (not shown) constituting the NC apparatus 42.

If the motor position at which some degree of energy supply becomes necessary during the acceleration of the motor 4 is known in advance, not only the motor position command (in step S61, moving from 0 to 100 mm) but also the energy supply timing (in step S62, Q2 ON at 50 mm) is specified to the motor driving program, and the switch Q2 in the charge/discharge control circuit 7 of the first embodiment shown in FIG. 2 or the charge/discharge control circuit 7' of the second embodiment shown in FIG. 3 is turned on (step S63).

In relation to the energy supply start timing and other timings, the switch Q1 in the charge/discharge control circuit 7 of the first embodiment shown in FIG. 2 or the switch Q2 in the charge/discharge control circuit 7' of the second embodiment shown in FIG. 3 may be turned on by an external input signal not shown.

Figure 7:
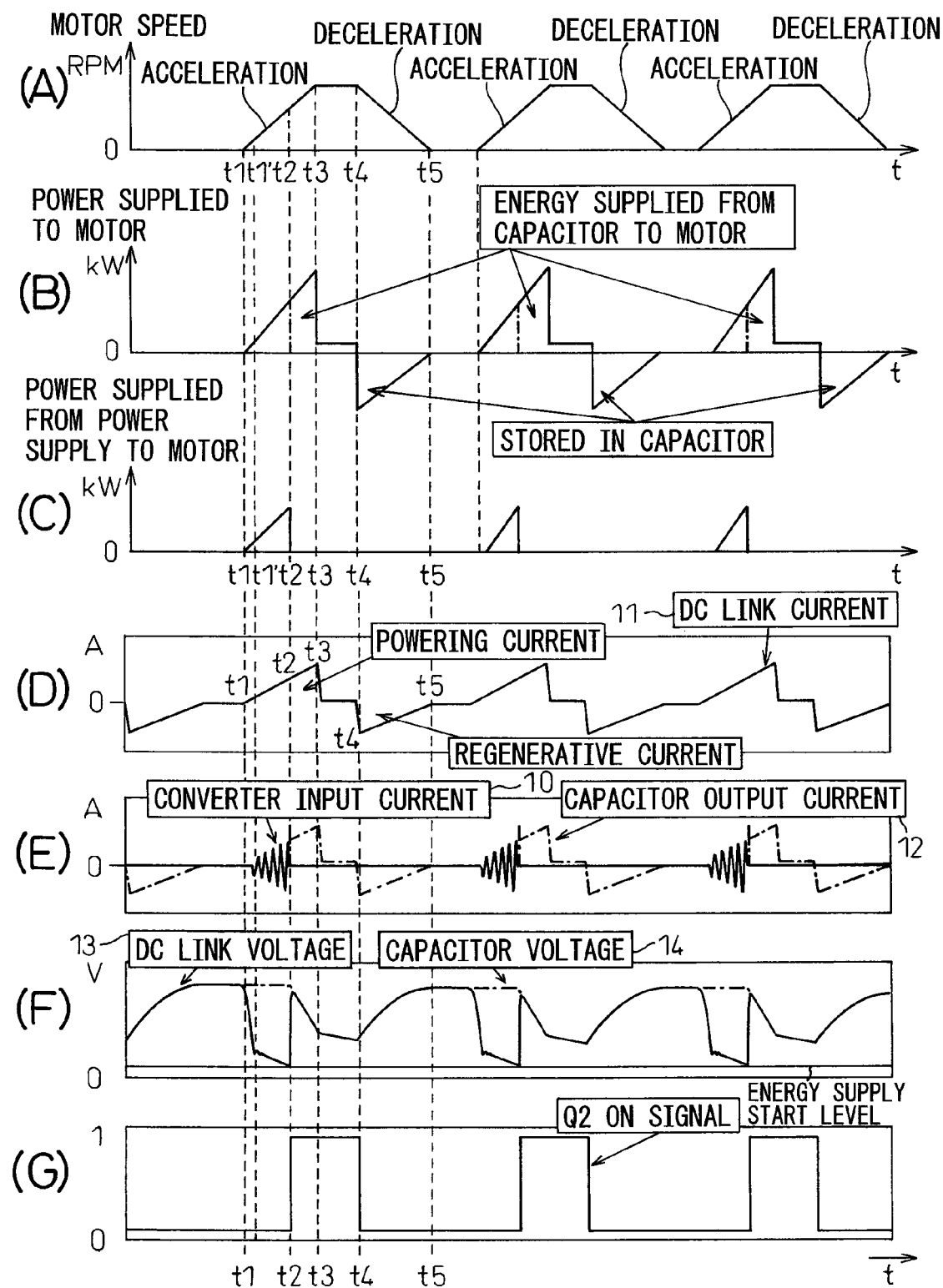
FIGS. 7(A) to 7(C) are diagrams showing the relationship between motor speed and energy in the motor driving apparatus according to the one embodiment of the present invention shown in FIG. 1.
FIGS. 7(D) to 7(F) are time charts showing the results of simulation of various parts in operation.
FIG. 7(G) is a diagram showing a control signal for Q2.

FIGS. 7(A) to 7(C) are diagrams showing the relationship between motor speed and energy in the motor driving apparatus according to the one embodiment of the present invention shown in FIG. 1, FIGS. 7(D) to 7(F) are time charts showing the results of simulation of the various parts in operation, and FIG. 7G is a diagram showing a control signal for Q2. In FIGS. 7(A) to 7(G), the abscissa represents the time, the ordinate in FIG. 7(A) represents the motor speed RPM, the ordinate in FIG. 7(B) represents the power kW supplied to the motor, the ordinate in FIG. 7(C) represents the power kW supplied from the power supply to the motor, the ordinate in FIG. 7(D) represents the DC link current, the ordinate in FIG. 7(E) represents the converter input current and the capacitor output current, the ordinate in FIG. 7(F) represents the DC link voltage (capacitor voltage), and the ordinate in FIG. 7(G) represents the ON/OFF state of the Q2 control signal.

As can be seen from FIGS. 7(A) to 7(C), power is supplied from the power supply to the motor 4 during a prescribed period from time t1' to time t2 in the early part of acceleration, and power is supplied from the capacitor C8 to the motor 4 during the acceleration period from time t2 to time t3 after the prescribed period in the early part of acceleration has elapsed. Here, time t2 indicates the timing at which to start the supply of the energy stored in the capacitor C8 to the motor 4 (that is, to turn on the switch Q2 in the energy charge/discharge control circuit 7, 7', 7") by detecting that the input current or output current or output voltage of the converter 2 has become equal to a predetermined value.

When supplying the energy from the capacitor C8 to the motor 4 during the period from time t2 to time t3, the amount of energy to be supplied from the capacitor C8 to the motor 4 is controlled by switching the switch Q2 on and off so that the input current to the converter C8 does not exceed a predetermined value. In this way, the charge/discharge control circuit 7, 7', 7" supplies the energy stored in the capacitor C8 to the motor 4 in the second half period of acceleration of the motor 4, and thus reduces the power to be supplied from the power supply.

During the constant speed period from time t3 to time t4 after the end of the acceleration, power is supplied from the capacitor C8 to the motor 4, and during the deceleration period from time t4 to time t5, regenerative energy is stored in the capacitor C8.

As can be seen from FIGS. 7(D) to 7(G), power is supplied from the power supply to the motor 4 via the converter 2 and inverter 3 (the converter input current 10) during the prescribed period from time t1' to time t2 in the early part of acceleration, and power is supplied to the motor 4 from the capacitor 8 as well as from the power supply during the acceleration period from time t2 to time t3 after the prescribed period in the early part of acceleration has elapsed. Here, time t2 indicates the timing at which to start the supply of the energy (capacitor voltage 14) stored in the capacitor C8 to the motor 4 (that is, to turn on the switch Q2 in the energy charge/discharge control circuit 7, 7', 7") by detecting that the input current to the converter 2 has become equal to a predetermined value.

When power is supplied from the power supply to the motor 4 during the prescribed period from time t3 to time t4 after the end of the acceleration, the amount of energy to be supplied from the capacitor C8 (the capacitor output current 12) is controlled by switching the switch Q2 on and off so that the input current to the capacitor C8 does not exceed a predetermined value.

During the deceleration period from time t4 to time t5, regenerative energy from the motor 4 is recovered and stored in the capacitor C8. In this way, the charge/discharge control circuit 7, 7', 7" reduces the average power supplied from the power supply to the motor 4, by supplying the energy, stored in the capacitor C8 during the deceleration, to the motor 4 during the second half period of acceleration.

The increase in the energy being supplied to the motor 4 during the second half period of acceleration of the motor 4 is detected by detecting, for example, a drop in the DC link voltage, and the energy is supplied from the capacitor C8 to the motor 4. As a result, the period that the energy is supplied from the power supply to the motor 4 is limited to the first half period of acceleration of the motor 4 where the output requirement is relatively small, and its input current peak is thus suppressed compared with that of the prior art.

Next, a description will be given below of a motor driving apparatus that performs control so that the electric energy stored in the capacitor C8 is discharged where it is needed, but is not discharged where it is not needed. With this control, the capacitance of the capacitor used to store energy can be reduced, while also reducing the average power supplied from the power supply to the motor 4.

Figure 8:
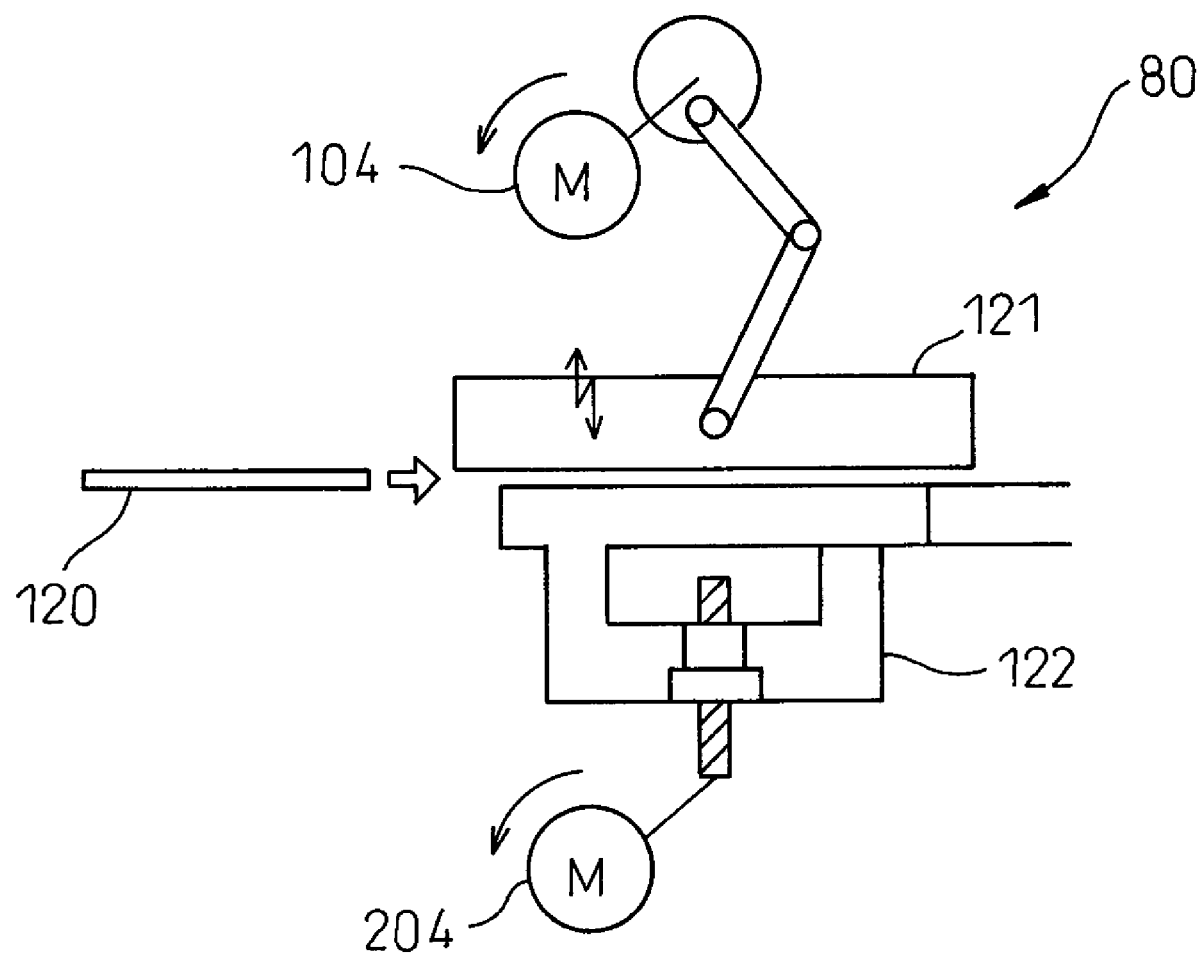
FIG. 8 is a diagram showing a press machine having a slide and a die cushion.

FIG. 8 is a diagram showing a press machine 80 having a slide 121 and a die cushion 122. The slide 121 is driven by a main motor 104 to be described later with reference to FIGS. 11(A) and 11(B), and the die cushion 122 is driven by a sub-motor 204. The main motor 104 is driven by a main motor driving apparatus 201 shown in FIGS. 11(A) and 11(B), and the sub-motor 204 is driven by a sub-motor driving apparatus 202 shown in FIGS. 11(A) and 11(B). The press machine 80 is a machine used to press a steel plate 120. The slide 121 and the die cushion 122 are each equipped with a mold. The slide 121 moves up and down and, when moved down, it strikes the die cushion 122, and further moves down while pressing the die cushion 122 with a prescribed force, thus forming the steel plate 120. The die cushion 122 dampens the shock when the slide 121 strikes it, and during the subsequent pressing, the die cushion 122 moves down together with the slide 121 while controlling the pressing force applied to the steel plate 120. With this operation, the quality of the press-formed steel plate 120 is improved.

Figure 11A:
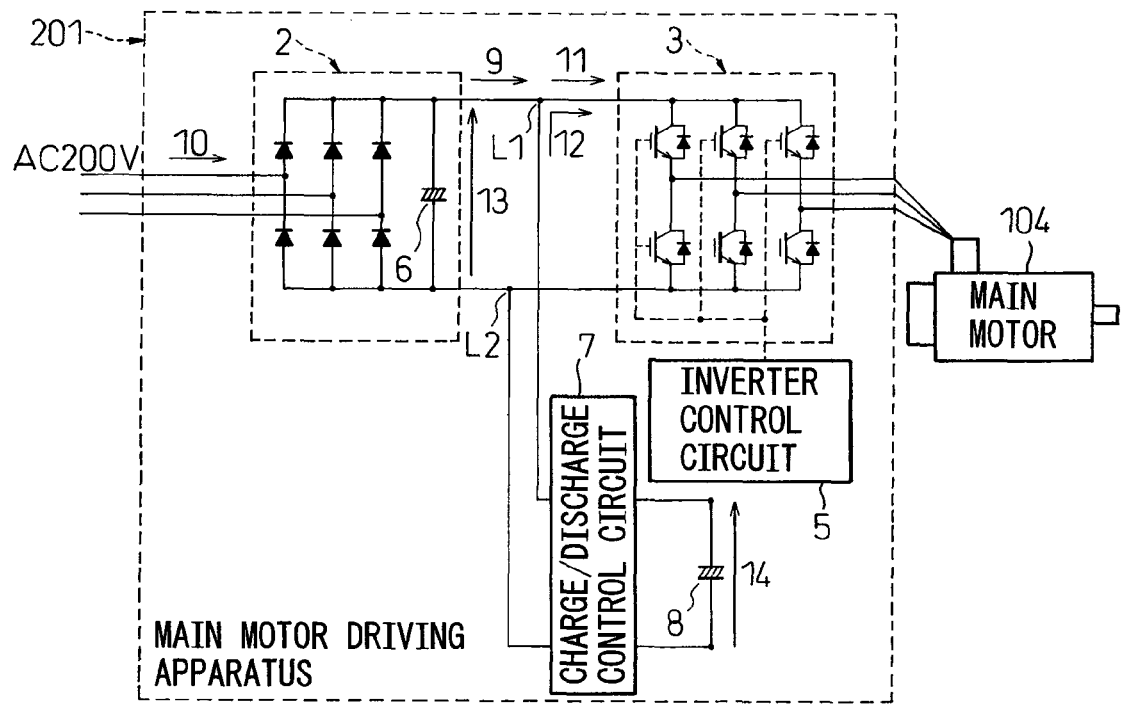
FIGS. 11(A) and (B) are a diagram showing a main motor driving apparatus, which is identical to the one shown in FIG. 1, and a sub-motor driving apparatus, which is identical to the one shown in FIG. 13.
Figure 11B:
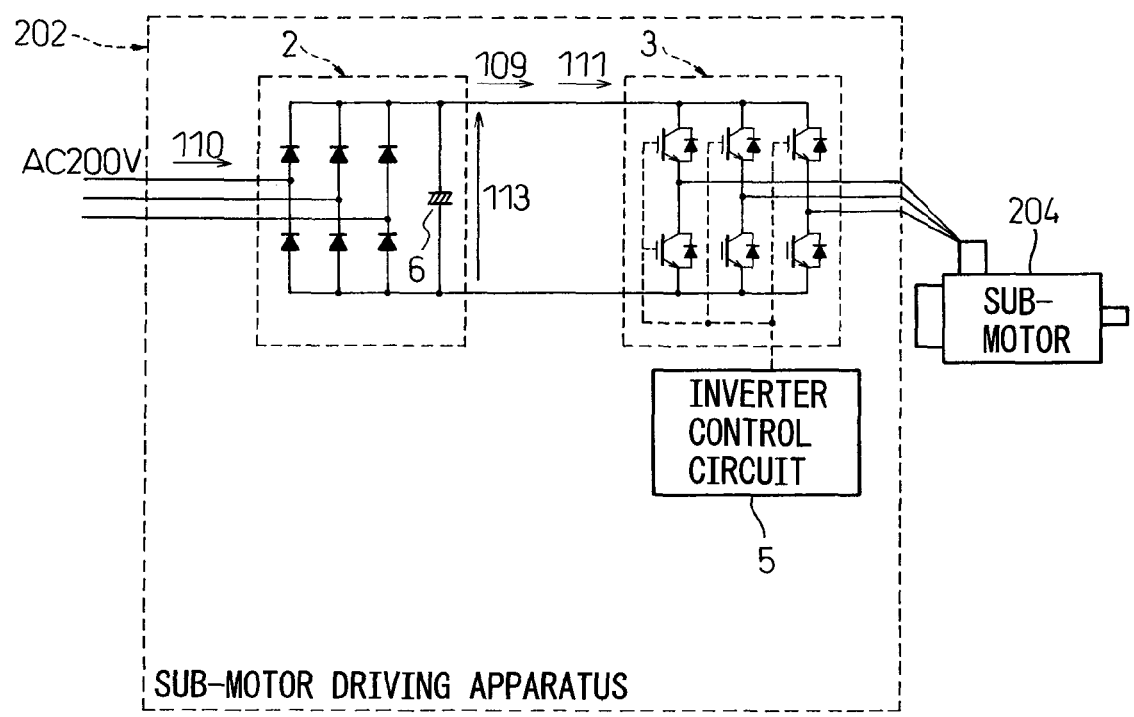

In the main motor driving apparatus 201 (see FIGS. 11(A) and 11(B)) for the servo press 121 shown in FIG. 8, the discharge of energy from the capacitor C8 to the main motor 104 begins when the die cushion 122 passes a predetermined position or starts accelerating, and ends when the die cushion 122 moves down to a predetermined position or starts decelerating. The discharge of energy from the capacitor C8 in the main motor driving apparatus 201 to the main motor 104 is not performed, except during the period that starts when the die cushion 122 passes the predetermined position or starts accelerating and ends when it starts decelerating. Here, the sub-motor driving apparatus 202 (see FIGS. 11(A) and 11(B)) for the die cushion 122 shown in FIG. 8 may be constructed from a prior known one.

Figure 9:
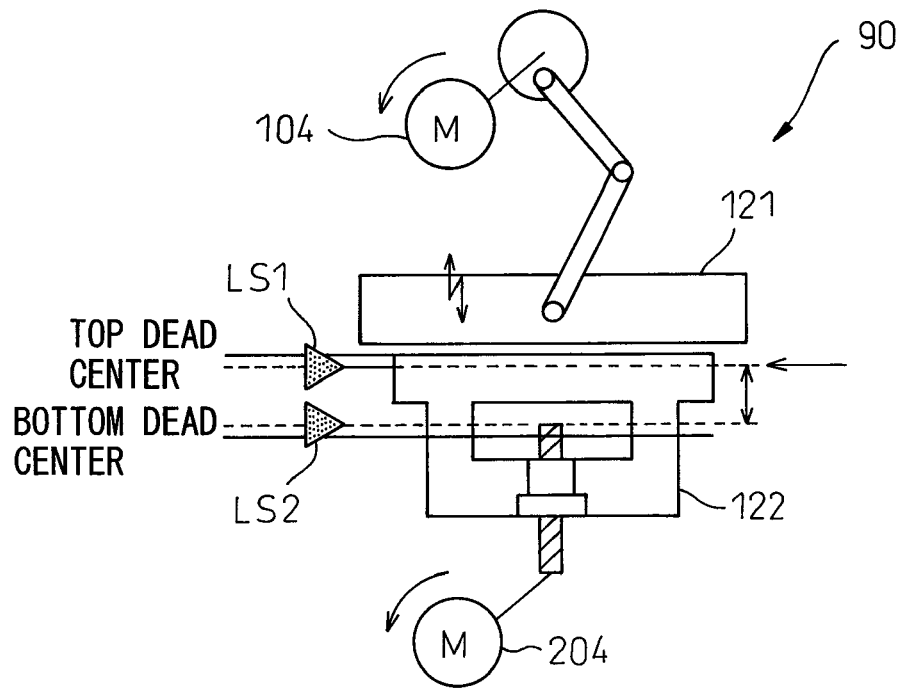
FIG. 9 is a diagram showing a press 90 which is similar to the press machine 80 shown in FIG. 8, except for the inclusion of limit switches LS1 and LS2 for detecting the positions of the top dead center and bottom dead center of the die cushion.

FIG. 9 is a diagram showing a press 90 which is similar to the press 80 shown in FIG. 8, except for the inclusion of limit switches LS1 and LS2 for detecting the positions of the top dead center and bottom dead center of the die cushion. The mold contained in the die cushion 122 is hidden from view and therefore not shown here.

When the die cushion 122 has lowered to a position slightly lower than the top dead center, the capacitor C8 in the main motor driving apparatus 201 begins to discharge the stored electric energy to the main motor 104, and when the die cushion 122 has reached a position slightly higher than the bottom dead center, the discharge is stopped. The discharge of energy from the capacitor C8 in the main motor driving apparatus 201 to the main motor 104 is not performed, except during the period that starts when the die cushion 122 passes the predetermined position or starts accelerating and ends when it starts decelerating.

Figure 10:
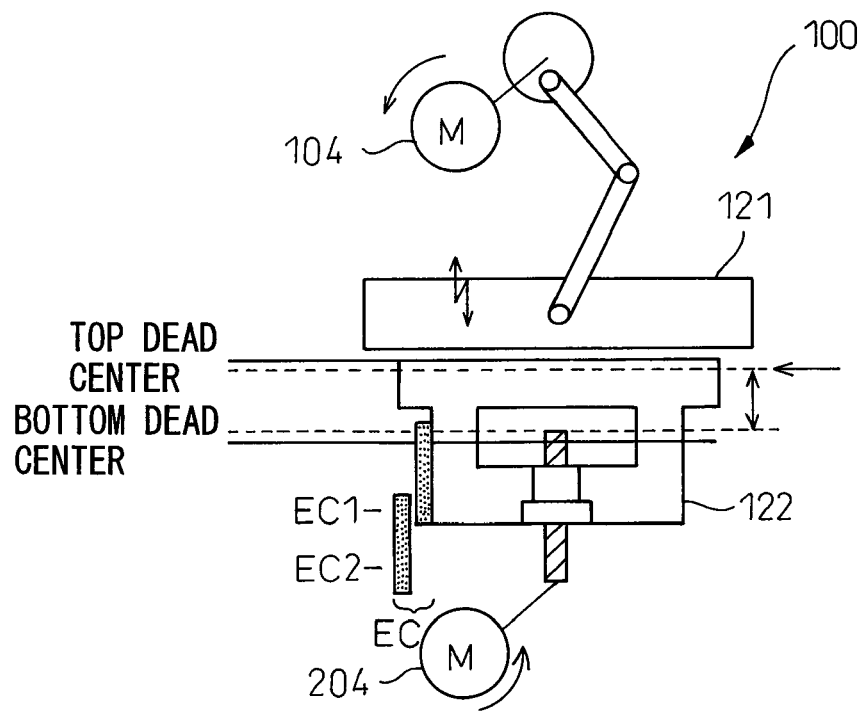
FIG. 10 is a diagram showing a press 100 which is similar to the press machine 80 shown in FIG. 8, except for the inclusion of a pair of encoders EC for detecting the positions EC1 and EC2 of the top dead center and bottom dead center of the die cushion.

FIG. 10 is a diagram showing a press 100 which is similar to the press 80 shown in FIG. 8, except for the inclusion of a pair of encoders EC for detecting the positions EC1 and EC2 of the top dead center and bottom dead center of the die cushion. The mold contained in the die cushion 122 is hidden from view and therefore not shown here.

When the die cushion 122 shown in FIGS. 8 to 10 has lowered to a position slightly lower than the top dead center, the capacitor C8 in the main motor driving apparatus 201 begins to discharge the stored electric energy to the main motor 104, and after the die cushion 122 has reached a position slightly higher than the bottom dead center, the discharge is stopped. The discharge of energy from the capacitor C8 in the main motor driving apparatus 201 to the main motor 104 is not performed, except during the period from the start to the end of the above discharge.

In relation to the die cushion 122 shown in FIGS. 8 to 10, an external input signal is generated in accordance with the position of the machine. When the die cushion 122 is located at one of the predetermined positions indicated by dashed lines in FIGS. 9 and 10, the external input signal is generated so as to turn on or off the signal generated by software in accordance with the limit switch or encoder signal.

Since the position of the machine is controlled by a control program incorporated in the machine control apparatus, the external input signal is generated so as to turn off the signal generated by software in accordance with the limit switch or encoder signal.

Generally, when controlling the machine, information indicating the real position of the die cushion for absorbing the impact of collision between the slide 121 and the die cushion 122 may be acquired from a position detector such as the limit switch or encoder installed on the die cushion 122 and, based on the thus acquired real position, an external input signal may be generated for input to the main motor driving apparatus 201 for the main motor 104 that drives the press machine 80. This external input signal is created, for example, in the NC apparatus by using software.

Figure 13:
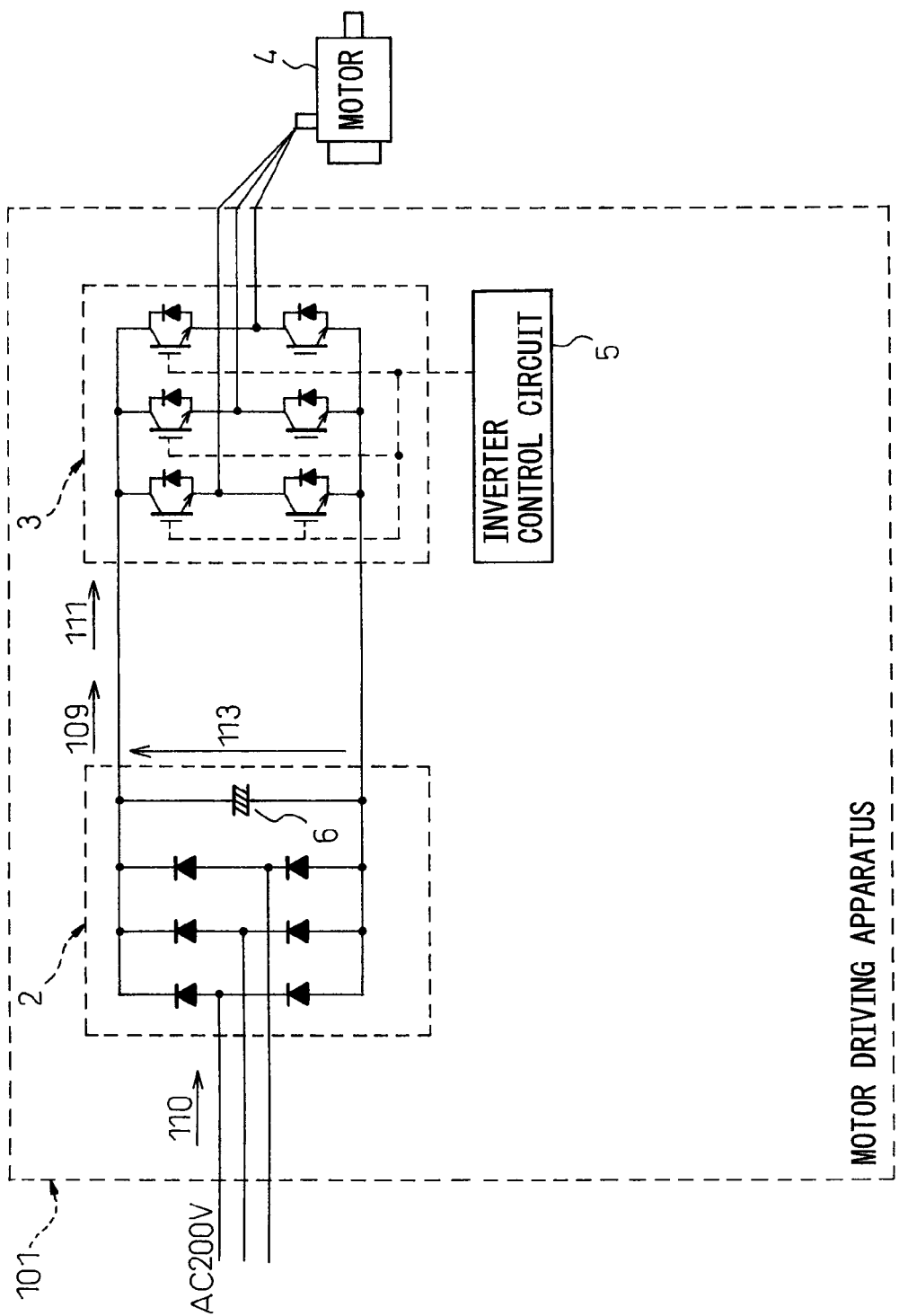
FIG. 13 is a circuit diagram of a motor driving apparatus according to the prior art.
Figure 14:
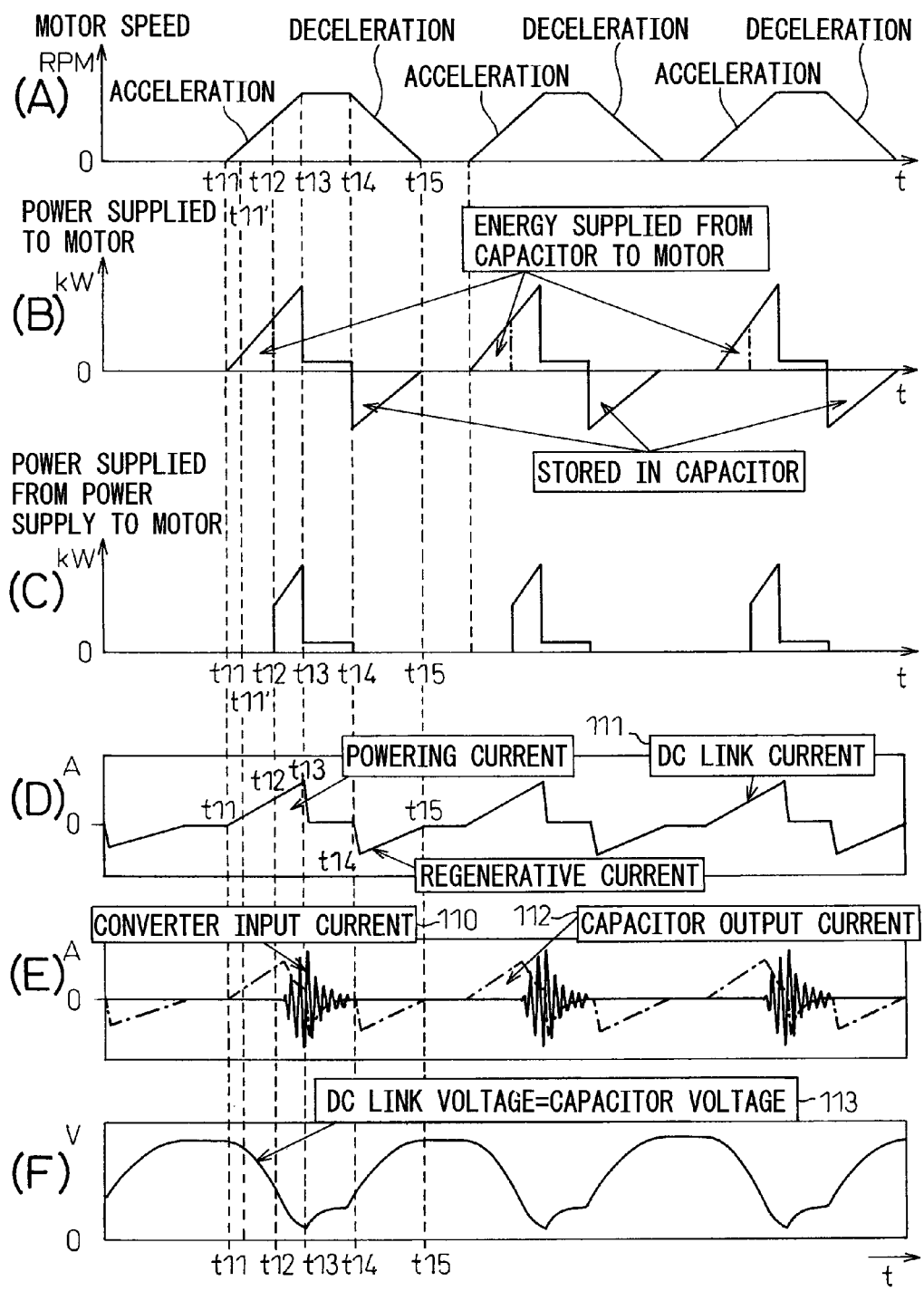
FIGS. 14(A) to 14(C) are diagrams showing the relationship between motor speed and energy in the motor driving apparatus according to the prior art.
FIGS. 14(D) to 14(F) are time charts showing the results of simulation of various parts in operation.

FIGS. 11(A) and (B) are a diagram showing the driving apparatus for the press machine 80, that is, the main motor driving apparatus which is identical to the one shown in FIG. 1 and the sub-motor driving apparatus which is identical to the one shown in FIG. 13. The sub-motor driving apparatus 202 is the apparatus according to the prior art, and the main motor driving apparatus 201 is the apparatus according to the present invention shown in FIGS. 11(A) and (B): The main motor driving apparatus 201 operates as described below.

FIG. 12(A) is a diagram showing the output kW of the main motor in the motor driving apparatus according to the present invention, FIG. 12(B) is a diagram showing the power kW supplied to the main motor, FIG. 12(C) is a diagram showing the output kW of the sub-motor, FIG. 12(D) is a diagram showing the power kW supplied from the power supply to the main motor and the sub-motor, and FIG. 12(E) is a diagram showing the external signal for controlling the discharge.

In FIGS. 12(A) to 12(E), the main motor 104 is shown in FIGS. 8 to 10. In FIGS. 12(A) to 12(D), the abscissa represents the time t, the ordinate in FIGS. 12(A) and 12(C) represents the output kW, and the ordinate in FIGS. 12(B) and 12(D) represents the supplied power kW. The ordinate in FIG. 12(E) represents the ON/OFF state of the external input signal for controlling the discharge. For example, when the external input signal from the NC apparatus is H, the electric energy stored in the capacitor 8 in the main motor driving apparatus 201 is discharged to drive the main motor 104.

As shown in FIG. 12(A), when power is supplied to the main motor 104, the output (kW) of the main motor 104 begins to increase at power supply start time t0 and continues to increase gradually until time t10 at which the motor reaches a constant speed; then, the output begins to decrease at power supply end time t22 and continues to decrease gradually until time t30 at which the motor stops.

Figure 15:
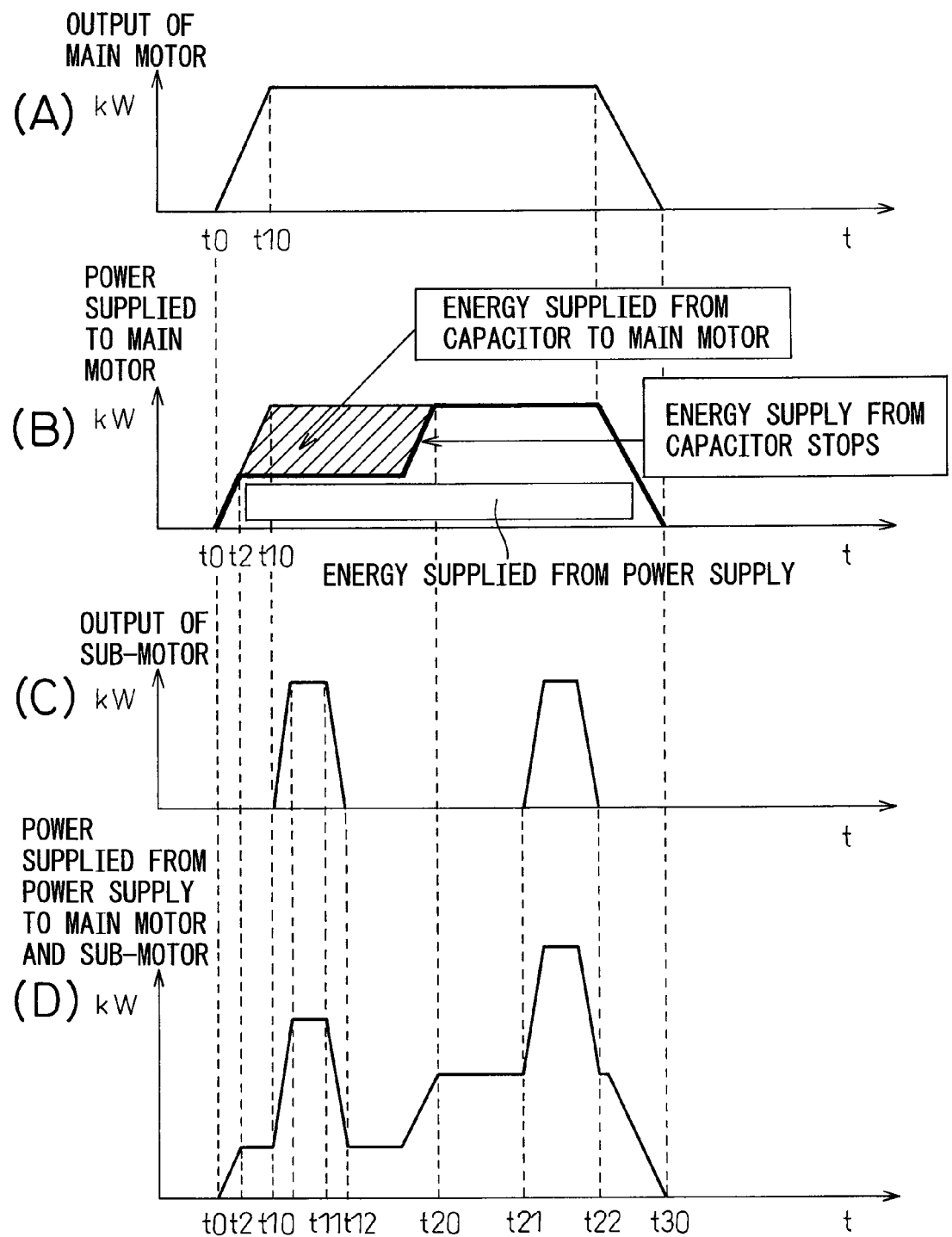
FIGS. 15(A) to 15(D) are diagrams each showing the output of a motor in the motor driving apparatus according to the prior art.

In the prior art, since there is a limit to the power supplied to the main motor 4, the capacitor 8 may cease to supply power to the main motor 104 in the middle of the motor operation, as shown by hatching in FIG. 15(B). To address this, in the present invention, power is supplied to the main motor 104 from the power supply as well as from the capacitor 8. FIG. 12(C) shows the output from the power supply to the sub-motor 204. FIG. 12(D) shows the power supplied to the main motor 104 and the sub-motor 204.

Referring to FIG. 12(B), since the energy being supplied from the capacitor 8 and the power supply to the main motor 104 may be interrupted, as described above, energy is supplied to the main motor 104 only from the power supply during the period from time t12 to time 20, and the capacitor 8 is charged during this period, thereby preventing the energy supply from the capacitor 8 to the main motor 104 from being interrupted in the ensuing period. As shown by hatching in FIG. 12(B), not only the power from the power supply but also the energy stored in the capacitor 8 is supplied to the main motor 104 during the period from time t1 to t12 and the period from time t20 to t23. During the period that power need also be supplied to the sub-motor 204, i.e., the period from time t1 to t12 and the period from time t20 to t23, power is supplied to the main motor 104 from the capacitor 8 as well as from the power supply.

As shown in FIG. 12(D), the energy to the main motor and the sub-motor is supplied from the capacitor 8 as well as from the power supply during the period from time t1 to t12 and the period from time t20 to t23, and only from the power supply during the period from time t0 to t1 and from time t12 to t20 and the period after time t23.

As shown in FIG. 12(E), in the present invention, control is performed so as to stop the supply of energy from the capacitor 8 during the period that the energy stored in the capacitor 8 need not be supplied, that is, during the period from time t12 to time t20.

As described above, in the motor driving apparatus according to the present invention, since control is performed so that the electric energy stored in the capacitor is supplied to the motor when it is needed, but not supplied when it is not needed, the electric energy stored in the capacitor can be efficiently used, and the peak power from the power supply can also be suppressed. Further, this configuration serves to reduce the capacitance of the capacitor while also reducing the average power supplied from the power supply.

The invention claimed is:

1. A motor driving apparatus comprising:
a converter configured to receive an AC voltage and convert the received AC voltage to DC power;
an inverter configured to receive the DC power from the converter and convert the received DC power to AC power;
a charge/discharge control circuit; and
a capacitor connected in parallel to a link section between said converter and said inverter,
wherein energy stored in said capacitor is charged and discharged at arbitrary timing by said charge/discharge control circuit; and
wherein the charge/discharge control circuit includes at least a first diode having an first anode and a first cathode, wherein the first anode is connected to a discharging terminal of said capacitor and the first cathode is connected to a remainder of the charge/discharge control circuit.

2. The motor driving apparatus as claimed in claim 1, wherein said arbitrary timing includes timing specified by an external input signal.

3. The motor driving apparatus as claimed in claim 2, wherein said external input signal is a signal that is output from a limit switch for detecting a position of a moving object in a machine driven by a motor, or a signal that is output when a motor position specified by a program or the detected position of said moving object exceeds a predetermined position.

4. The motor driving apparatus as claimed in claim 1, wherein a discharge circuit provided in said charge/discharge control circuit is turned on so that the energy stored in said capacitor is supplied to said inverter when an AC current input from a power supply to said converter or a converter output current obtained by rectifying said AC current to DC current becomes equal to or exceeds a predetermined current value.

5. The motor driving apparatus as claimed in claim 1, wherein a discharge circuit provided in said charge/discharge control circuit is turned on so that the energy stored in said capacitor is supplied to said inverter when a DC voltage in said link section becomes equal to or drops below a predetermined voltage value.

6. The motor driving apparatus according to claim 1, wherein
the charge/discharge control circuit further comprises an inductor, a first switch, a second switch, a second diode, and a third diode;
the first cathode is connected to a node connecting the inductor and the first switch;
the inductor is further connected in series with the second diode; and
the third diode and a second switch are connected in parallel with the first switch and the second diode.

7. The motor driving apparatus according to claim 1, wherein
the charge/discharge control circuit further comprises a second diode, a second anode, a second cathode, an inductor, a first switch/diode pair, a second switch/diode pair;
the second diode is connected with the second anode connected to the discharging terminal of the capacitor;
the second cathode is connected to a first node connecting the inductor and the first switch/diode pair; and
the first cathode is connected to a second node connecting the inductor and the second switch/diode pair.

* * * * *